United States Patent Office 3,102,069
Patented Aug. 27, 1963

3,102,069
METHOD OF DESTROYING PLANT HARMFUL MICROORGANISMS
Henderikus Obias Huisman, Jan Hendrik Uhlenbroek, and Martinus Johannes Koopmans, all of Van Houtenlaan, Weesp, Netherlands, assignors to North American Philips Company, Inc., New York, N.Y., a corporation of Delaware
No Drawing. Original application June 11, 1956, Ser. No. 590,404, now Patent No. 3,014,837, dated Dec. 26, 1961. Divided and this application Mar. 6, 1961, Ser. No. 93,299
19 Claims. (Cl. 167—30)

This application is a division of United States patent application Serial Number 590,404, filed June 11, 1956, now U.S. Patent No. 3,014,837.

The agents used in agriculture, horticulture and fruit-growing to combat fungi or bacteria, to both of which will be referred to hereinafter as micro-organisms, have frequently the disadvantage that they may be at the same time more or less harmful to the plants to be protected from micro-organisms.

There are also substances, for example trichloromethyl-thiolsulphonates or organic mercury compounds that could be used on a larger scale to combat micro-organisms in agriculture, horticulture and fruitgrowing, if their phytoxical effect on the cultivated plants were not comparatively great. In order to avoid affection by particular kinds of microorganisms, many cultivated plants must therefore be treated with means which are, properly speaking, less suitable for this purpose.

In accordance with the invention it was now found that aromatic compounds having a fungicidal or bactericidal effect have small phytotoxicity, if at one of the carbon atoms of the aromatic nucleus there is bound an acylated amino group.

The invention relates to a method of producing agents for combating micro-organisms and is characterized in that a compound of the general formula:

R—NH-acyl is produced, wherein R designates an aromatic residue, of which one of the hydrogen atoms bound to a carbon atom of the aromatic nucleus is replaced by an acyl-amino group and one or more of the other hydrogen atoms of the aromatic nucleus is replaced by a group giving the compound fungicidal and/or bactericidal properties. The aromatic nucleus may be a phenyl- or a naphthy-nucleus. The acyl group may be the acyl residue of a saturated or unsaturated, aliphatic carbonic acid or, also of a mixed aliphatic-aromatic or an aromatic carbonic acid, for example formic acid, acetic acid, propionic acid, butyric acid, valeric acid, stearic acid, palmitic acid, crotonic acid, acrylic acid, oleic acid, phenyl-acetic acid, phenyl-propionic acid, phenyl-butyric acid, benzoic acid; $\alpha$ and $\beta$ naphthoic acid.

The term fungicide is to be understood to mean herein a compound having an $LD_{95}$ of at least 3 $p_C$ units in the experiments to be described hereinafter. A bactericide is to be understood to mean a compound which, in the experiments to be described hereinafter, in a concentration of $10^{-4}$ mol/ml. of at least one of the bacteria employed in the experiments to be described produces a conspicuous reduction of the growth. A compound having a phytotoxic effect is to be understood to mean a compound which damages the leaves of Indian cress in the experiments to be described hereinafter in a concentration of at least 10%, sprayed in a quantity of 10 cm.$^3$ of these 10% solutions on 1000 cm.$^2$ of leaf surface. It may be pointed out that it is known that acyl-amino compounds exert a smaller poisonous effect in some cases on living organisms than the corresponding non-acylated amino-compounds. This phenomenon is particularly employed in animal physiology. With respect to this known fact, the invention, however, provides a completely new insight, since it has not yet been recognized that aromatic fungicides or bactericides have substantially no phytotoxic effect, if an acylated amino group is bound to a carbon atom of the aromatic nucleus.

The invention is of particular importance in reducing the phytotoxic effect of aromatic fungicides and/or bactericides. It has been found that the phytotoxic effect of aromatic fungicides and/or bactericides, in which no acylated amino group is bound to the aromatic nucleus, is materially higher than the phytotoxic effect of aromatic fungicides and/or bactericides of which the formula corresponds to fungicides and/or bactericides referred to in the beginning of this paragraph, from which they differ, however, in that a hydrogen atom bound to a carbon atom of the aromatic nucleus is replaced by an acylated amino group. In accordance with a preferred embodiment of the invention compounds of the general formula: R—NH-acyl are produced, in which R designates an aromatic residue substituted in a manner such that the compound RH is an aromatic fungicide and/or bactericide with phytotoxic effect. To the compounds of the formula RH apply, of course, the aforesaid definitions for fungicides, bactericides and compounds having a phytotoxic effect.

The fungicidal and/or bactericidal acivity of the amino-acylated compounds may be lower than that of the non-amino-acylated compounds, but the difference in this effect is materially smaller than the difference in the phytotoxic effect of the amino-acylated compounds and of the non-amino-acylated compounds. On the other hand, owing to the introduction of an acyl-amino group the fungicidal or the bactericidal effect may increase, while in many cases this activity does not vary. According to the invention the phytotoxic effect of an aromatic fungicide or bactericide will decrease at any rate owing to the introduction of an acyl-amino group at the aromatic nucleus.

Hydrogen atoms of the aromatic nucleus of the compounds according to the invention may be substituted by groups of very different chemical structure. These groups may, for example, have the following structure:

—CO.O.S.CCl$_3$; —S.S.CCl$_3$; —O.CO.CH$_3$;
—OH:OH.NO$_2$; —CO.N$_3$; —CH:NOH.OH.

The compounds according to the invention can be produced in various ways. The acylated-amino group can be introduced into a compound of the formula RH, but as an alternative the starting material may be an aromatic compound, in which the acyl-amino group is already contained, this compound being then modified in a manner such that the compound R—NH-acyl is obtained.

The last-mentioned method will be especially prefererd when the substituents in the aromatic nucleus of the compound R—NH-acyl are chemically reactive and would decompose, if it would be attempted to introduce an acyl-amino group into aromatic compounds containing these groups.

If the compound R—NH-acyl is of a complicated structure, the substituents in the aromatic nucleus may be introduced in parts, the introduction of a further group being started before the substitution has been completed.

For the introduction of an amino-group into an aromatic nucleus various methods are available (vide inter alia Karrer, Organic Chemistry, 1938, page 412, for method of producing aromatic amines). An aromatic compound may, for example, be nitrated with nitric acid to obtain a nitro-compound, which substance is then reduced to the corresponding amine. This reduction may, for example be effected with tin and hydrochloric acid or with iron and hydrochloric acid, but, if necessary, it may be carried out electro-chemically or by catalytic hydrogenation, for example under the action of Raney-nickel, platinum or palladium-catalysts. In a further method the amino group is introduced into the aromatic nucleus by converting an aromatic halide with ammonia. It is furthermore possible, in certain cases, for example with resorcinol, to replace an aromatic hydroxyl-group by an amino group under the action of ammonia, if the reaction mixture contains sulphite. Finally, aromatic carboxylic acids may be converted into the corresponding amines by the so-called Hofmann or Curtius method, which is carried out via the acid amides and the acid azides respectively.

The aromatic amino compounds may be converted into the corresponding acyl compounds by acylating the amino groups with an acid halide, for example, acetic acid chloride, a carboxylic acid, for example, formic acid, acetic acid, propionic acid or with an acid anhydride, for example acetic acid anhydride or propionic acid anhydride.

As stated above, the fungicidal or the bactericidal groups may, if desired, be introduced subsequent to the introduction of the amino group and prior to the acylation: the said groups would be decomposed or separated out, if the aromatic compound, already containing these functional groups, would be aminated.

The invention is of particular importance for the production of fungicides and/or bactericides of the general formulae:

(A) 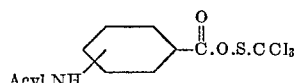

(B) 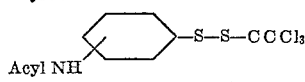

(C) 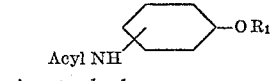

wherein $R_1$ designates hydrogen or an acyl residue.

(D) 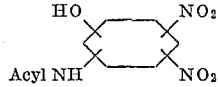

(E) 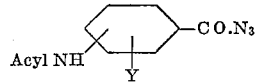

wherein Y designates hydrogen or a polar bond, for example a negative substituent for example a nitro group.

(F) 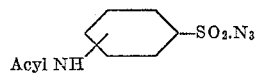

(G) 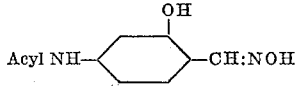

In all these formulae acyl designates an acid residue of an aliphatic, saturated or unsaturated carboxylic acid or a mixed aliphatic-aromatic carboxylic acid or of an aromatic carboxylic acid, for example an acid residue of acetic acid, propionic acid, valeric acid, butyric acid, stearic acid, palmitic acid, acrylic acid, crotonic acid, oleic acid, phenyl-acetic acid, phenyl-propionic acid, phenyl-butyric acid, benzoic acid, α and β naphthoic acid.

The compounds of the general formula:

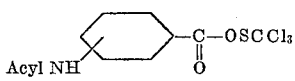

may be produced by causing a metal salt of a compound of the formula:

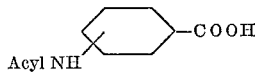

to react with P.C.M. The reaction is preferably carried out in an a-polar solvent, for example, benzene, ligroine, cyclohexane, petroleum-ether at a temperature of 60° to 100° C.

The compounds of the formula:

may be produced by causing a thiophenol to react with P.C.M. The reaction is preferably carried out in an a-polar solvent, for example, benzene, petroleum-ether at a temperature of 50° to 100° C. It has been found that particularly the para-compounds of this kind of compounds are of importance.

The compounds of the general formula:

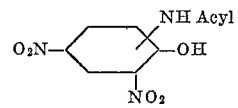

may be produced by nitrating an acyl-amino-phenylester, for example, the acetate ester with concentrated nitric acid and by subsequent saponification of the nitrated ester obtained, with caustic soda, the phenolate obtained being converted with acid into the corresponding dinitro-acyl-amino phenol. Particularly the 2.4 dinitro-5-acyl-amino-phenol of this group of compounds has been found to be of importance.

The compounds of the general formula:

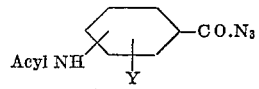

wherein Y designates hydrogen or a polar group, for example an $NO_2$ bond, may be produced by causing an acid halide, preferably an acid chloride of the formula:

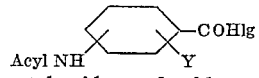

to react with a metal azide, preferably an alkali azide, for example, sodium azide.

The acid halide is preferably dissolved in an organic solvent, which does not react with the acid halide, for example acetone, methyl-ethyl-ketone or benzene, this solution being added to an aqueous solution of the azide.

Compounds of this type according to the invention have yielded satisfactory results, when the acyl amino group occupies the para position relative to the group of $CO.N_3$. If the group Y designates a negative substituent, for example, a nitro group, or a halogen atom, for example, chlorine, it is of importance that the group Y should be bound at the meta-position relative to the group of $CO.N_3$ to the benzene nucleus.

The production of the compounds of the general formula

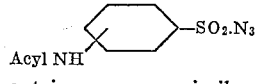

may be carried out in a manner similar to that referred to in the description of the production of compounds of the general formula:

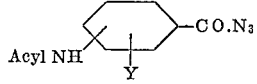

The compounds may be obtained by converting acyl-amino benzene sulphohalides with metal azides. It should be noted that the para acyl-amino benzene sulphazides have been found to be compounds having a satisfactory fungicidal effect.

The compounds obtained by carrying out the method according to the invention may be worked up in various ways to obtain fungicidal and/or bactericidal preparations. Potential methods of working up are:

(a) Mixable oils containing 15 to 20% active constituent, 15% non-ionogeneous emulsifier and otherwise solvents (mainly ketones, for example cyclohexanone);

(b) Aerosols, the solvents being for example acetone, methyl-ethyl-ketone and cyclohexanone, the propellent being methyl-chloride or Freon;

(c) Sprayable powders containing 50 to 80% active substance and otherwise flowing liquids, for example, fatty alcohol sulphonates, and disperging agents and/or carriers, for example kaoline, chalk, clay and admixtures to prevent lumping, for example, colloidal silicic acid;

(d) Sprayable powders containing for example 5% active substance in a mixture of infusorial silica, magnesium marlstone;

(e) Seed-protecting means, for example, 50% of the active substance combined with kaoline with the addition of adhesives, for example, watchmaker's oil;

(f) So-called "coated dust," the active substance being applied to an absorbing carrier, for example infusorial silica.

In the examples hereinafter methods of producing compounds according to the invention are described. (The temperatures in these examples are expressed in degrees centigrade.) The examples are followed by tables, in which the phytotoxic and fungitoxic properties of the amino-acylated and the non-amino-acylated compounds are indicated. The numerals indicated in each table for activity refer to a biological specimen series. The numerals of each table referring to a particular activity can be compared with one another. Of a few compounds indicated in the tables no examples are given. These compounds were produced in accordance with prescriptions known from literature. The method of determining the fungi-toxic effect of the tested compounds was performed as follows:

The compound to be tested was dissolved in acetone and so-called dilution series were made of this solution, this series being obtained by reducing each time the concentration of the compound to be tested by a factor 2. A few drops of each of these solutions of a size of 1 to 100 ml. were applied to glass plates, within paraffin rings provided thereon. The acetone was caused to evaporate, after which a drop of a size of 0.05 ml. of a suspension containing 10,000 spores of Fusarium culmorum per ml. of medium was caused to flow within each ring. The medium was aqueous, diluted cherry extract having a dry-substance content of 0.1%. The glass plates were then kept in a humid space at 24° C. for 18 hours. It was then stated microscopically with what concentration of the compound to be tested the spores of Fusarium culmorum had no longer been able to germinate or showed still some signs of life in the form of swellings, and of a small percentage of very short cotyledons. This limit concentration was referred to as L.D. 95, i.e. this concentration means a lethal dose for 95% of the number of spores exposed to this concentration of the substance to be tested. This L.D. value was indicated in so-called $p_C$ units. These are the negative logarithms (base 10) of the concentration, expressed in grams per ml. Expressed in $p_C$ units, the dilution with a factor 2 (as stated above) corresponds to an increase of $p_C$ by 0.3 unit.

The bactericidal effect was determined as follows. The compound to be tested was dissolved in acetone or suspended in water containing 2% of carboxymethyl-cellulose: of this solution or suspension a dilution series was made, the concentration of each term of the series differing by a factor 10 from that of the next-following term. 0.1 to 0.2 ml. of each solution was dispersed in 20 ml. of a nutrient containing 1% of peptone, 0.3% of meat extract (both of the trademark "Difco"), 1% of glucose, 0.3% of a product known under the tradename of "Poviet," 1% of $KH_2PO_4$, 2.5% of agar-agar of the tradename of "Bacto" and otherwise main water (pH 6.8). These nutrients were then modulated with suspensions of the following bacteria: Pseudomonas pyocyaneas, Escherichia coli, Mycobacterium phlei, Bacillus subtilis, Salmonella thyrium, Micrococcis aureus. Then the nutrients were kept at a temperature of 37° C. for 24 to 48 hours. For each dilution series the concentration of the tested compound was ascertained, which had just been able to bring about a total or substantially total reduction of the growth of the bacteria. This limit concentration was indicated by $p_C$, which designates the negative logarithm (base 10) of the limit concentration expressed in grammolecules/ml. When it was found that within a dilution series the concentration of the tested compound was not so high as to produce reduction of growth, it was indicated in the associated table by a hyphen.

The phytotoxic effect of the tested compounds was determined by spraying acetonic solutions or aqueous suspensions of the substances to be tested in a given concentration on test plants.

The quantity of liquid sprayed on the plants was 10 ml. per 1000 cm.² of leaf surface, on which the test specimen were provided. The plants used for these experiments had in general height of 7 to 12 cms. Only in the case of the Indian cress use was made of cut leaves, which were put with their stems in a bottle of water after the treatment. After having been sprayed, the plants or, in the case of the Indian cress, the leaves were put aside and kept at a temperature of 22° C. for five days. During this period the specimen were exposed to fluorescent tubes of the day-light type, whilst daylight was screened off. At the end of this period the measure of burning of the leaves was determined. It was expressed as follows:

0 = no visible damage,
1 = not more than 1/10 of the leaf surface (of the whole plant) is damaged,
2 = the damage is found on 1/10 to 1/3,
3 = 1/3 to 2/3 is burnt,
4 = 2/3 to 9/10 affected,
5 = almost the whole plant (more than 9/10) is destroyed,
6 = the plant has died.

The experiments showed that the phytotoxic effect of the same compound in the same concentration is the same in an acetone solution of the compound and in an aqueous suspension thereof. Blank experiments with acetone showed that the solvent in itself does not produce any damage to the leaves.

(A) COMPOUNDS OF THE GENERAL FORMULA

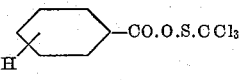

I. Trichlormethyl-Mercapto-p-Acetylaminobenzoate

From 12.0 g. (0.06 mol.) of dry sodium salt of p-acetaminobenzoic acid, 200 ml. of dry benzene and 12.2 g. (0.065 mol.) of P.C.M. was obtained by the method described in Example XIX 2 gs. of a crystalline compound, which, after recrystallization from benzene, decomposed at about 250° C. without melting and which was found to consist of not quite pure trichlormethyl-mercapto-p-acetylaminobenzoate.

II. Trichlormethyl-Mercaptobenzoate

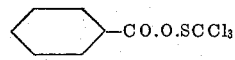

28.8 g. of dry sodium benzoate (0.2 mol) was suspended in 300 ml. of dry benzene, after which a solution of 41 g. (0.22 mol.) of P.C.M. in 120 ml. of dry benzene was added to the suspension. While stirring, the mixture was refluxed for 5 hours, after which the reaction mixture was filtered. After evaporation of the filtrate in vacuo an oil remained, which distilled in high vacuo at 113 to 118°

C. The yield was about 29 g., i.e. about 53%, calculated on sodium benzoate.

mixture was refluxed. A small quantity of oil was separated out, after which the reaction mixture was cooled to room temperature. Upon adding petroleum ether, 1.75 g. of trichlormethyl-p-acetaminophenyl-disulphide crystallized out and had a melting point of 155° C.

TABLE A

| | | Concentration | Phytotoxicity | | | | Fungitoxicity, LD 95 |
| | | | Broad bean | Cucumber | Peas | Tomato | |
|---|---|---|---|---|---|---|---|
| I | Cl₃.CS.O.CO—⬡—NH.CO.CH₃ | 10<br>3 | 4<br>2 | 5<br>3 | 4<br>2 | 5<br>4 | 5.0  5.0 |
| II | Cl₃.CS.O.CO—⬡ | 10<br>3 | 6<br>5 | 6<br>6 | 6<br>5 | 6<br>6 | 5.0  5.0 |

(B) COMPOUNDS OF THE GENERAL FORMULA

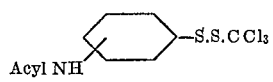

Acyl NH

TABLE B

| | | Concentration | Phytotoxicity | | | Fungitoxicity LD 95 |
| | | | Broad bean | Bush bean | Ind. Cr. | |
|---|---|---|---|---|---|---|
| III | Cl₃.CS.S—⬡ | 10<br>3 | 6<br>4 | 6<br>5 | 6<br>6 | 4.7 |
| IV | Cl₃.CS.S—⬡—NH—CO.CH₃ | 10<br>3 | 0<br>0 | 0<br>0 | 1<br>1 | 5.3 |

*III. Trichlormethyl-Phenyldisulphide*

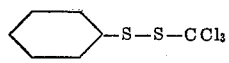

This compound was produced from thiophenol and P.C.M. by the method described in Rec. Trav. chim., 71, 1065 (1952).

*IV. Trichlormethyl-p-Acetaminophenyl-Disulphide*

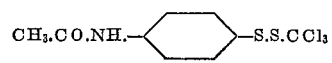

(C) COMPOUNDS OF THE GENERAL FORMULA

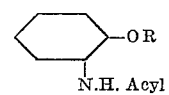

The following compounds were produced and compared with phenol V (VI) O-acetaminophenol
(VII) M-acetaminophenol
(VIII) P-acetaminophenol

TABLE C₁

| | | Phytotoxicity | | | | Fungitoxicity, LD 95 | Bactericidal effect | | | | | | |
| | | Concentration | Broad bean | Bush beam | Ind. Cr. | | Concentration | Salmonella typhiniureum | Micrococcus aureus | Pseudomonas pyocyanea | Escherichia coli | Mycrobacterium phlei | Bacillus subtillus |
|---|---|---|---|---|---|---|---|---|---|---|---|---|---|
| V | HO—⬡ | 10<br>3 | 6<br>4 | 6<br>4 | 6<br>6 | 2.3  2.3 | | | | 5 | | 5 | 5 |
| VI | HO—⬡(HN.CO.CH₃) | 10<br>3 | 1<br>0 | 0<br>0 | 2<br>1 | 2.0  2.0 | | | 5 | 5 | | 6 | 5-6 |
| VII | ⬡(NH.CO.CH₃)(HO) | 10<br>3 | 0<br>0 | 0<br>0 | 0<br>0 | 2.0  2.0 | 10⁻⁵–10⁹ | | 7-8 | | | | |
| VIII | ⬡(NH.CO.CH)(HO) | 10<br>3 | 1<br>0 | 0<br>0 | 1<br>1 | 2.0  2.0 | | | 5-6 | | | | |

4.0 g. (0.024 mol) of p-acetamino-thiophenol was dissolved in a mixture of 75 ml. of dry benzene and 4.5 g. (0.024 mol.) of P.C.M. For 15 minutes the reaction These compounds were produced by partial acetylation of the corresponding aminophenols The following compounds were compared with phenylacetate IX:

X O-acetaminophenylacetate
XI M-acetaminophenylacetate
XII P-acetaminophenylacetate These compounds were produced by acetylation of the corresponding aminophenols.

rated out was filtered off, washed, dried and recrystallized from 250 ml. of ethylalcohol. The compound 2,4-dinitro-5-acetaminophenylacetate (5.5 g.=37%) obtained consisted of orange-brown needles with a melting point of 148 to 149° C. By dissolving this product in acetone and by treating it with decolorising carbon almost colorless crystals with a melting point of 149 to 150° C. were obtained.

TABLE C

| | | Phytotoxicity | | | | Fungitoxicity, LD 95 |
|---|---|---|---|---|---|---|
| | | Concentration | Broad bean | Bush bean | Ind. Cr. | |
| IX | H₃C.C(O)—O—⌬ | 10<br>3 | 2<br>0 | 5<br>1 | 6<br>5 | 2.0 | 2.0 |
| X | H₃C.C(O)—O—⌬(NH.CO.CH₃) | 10<br>3 | 0<br>1 | 0<br>0 | 0<br>1 | 2.0 | 2.3 |
| XI | H₃C.C(O)—O—⌬(NH.CO.CH₃) | 10<br>3 | 2<br>1 | 1<br>0 | 0<br>0 | 2.6 | 2.3 |
| XII | H₃C.C(O)—O—⌬—NH.CO.CH₃ | 10<br>3 | 0<br>0 | 0<br>0 | 0<br>0 | 3.2 | 3.2 |

(D) COMPOUNDS OF THE GENERAL FORMULA

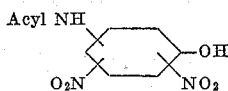

XIV. 2,4-Dinitro-5-Acetaminophenol

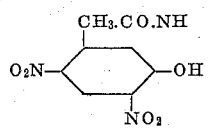

8.0 (0.028 mol) of 2,4-dinitro-5-acetamino-phenylacetate was introduced into a solution of 3.0 g. (0.028 mol) of anhydrous soda in 100 ml. of water. The mixture obtained was slowly heated to a boiling point, until all solid substance had dissolved. Then the mixture was cooled and acidified with 2NHCl, after which 2,4-dinitro-5-acetamino-phenol crystallized out. After filtering, washing and drying 6.2 g. (81%) of this compound with a melting point of 161 to 163° C. was obtained. After recrystallization from a mixture of acetone and water the substance had a melting point of 163.5 to 164.5° C.

TABLE D

| | | Phytotoxicity | | | | Fungitoxicity, LD 95 | Bactericidal effect | | | | | |
|---|---|---|---|---|---|---|---|---|---|---|---|---|
| | | Concentration | Broad bean | Bush bean | Ind. Cr. | | Concentration | Salmonella typhimureum | Micrococcus aureus | Pseudomonas pyocyanea | Escherichia coli | Mycobacterium phlei | Bacillus subtilus |
| XIII | HO—⌬(NO₂)—NO₂ | 10<br>3 | 6<br>6 | 6<br>6 | 6<br>6 | 5.0 | | 6.7 | 8 | -------- | 6 | -------- | -------- |
| XIV | NO₂—⌬(NHCOCH₃)(OH)—NO₂ | 10<br>3 | 1<br>1 | 1<br>0 | 4<br>-- | 4.4<br>2 | about 10⁻⁵–10⁻⁹ | 6 | 8 | -------- | 5–6 | -------- | -------- |

10.0 g. of m-acetaminophenylacetate was dissolved in 50 ml. of acetic acid anhydride, after which, while stirring and cooling at a temperature of −2 to −7° C., 33 ml. of nitric acid (S.W.1.52) was added in drops during one hour.

The reaction mixture was restirred at 20 to 25° C. for one hour and then poured out on ice. The product sepa- (C) COMPOUNDS OF THE GENERAL FORMULA

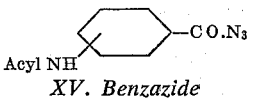

XV. Benzazide

This substance is produced in accordance with a prescription of J. Chem. Soc., 51, pages 24 to 38 (1929).

XVI. p-Acetamino-Benzazide

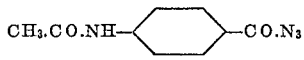

3.6 g. (0.02 mol) of p-acetamino-benzoic acid was suspended in 36 ml. of dry ethyl-ether. Thereto was added

XX. p-Acetaminobenzene-Sulphonazide

This compound is known from a publication of Curtius and Stoll in J. Pr. Chemie, 112, page 119, 128. The compound was produced from p-acetamino-benzene-sulphonchloride and sodium azide.

TABLE E

| | | Phytotoxicity | | | | Bactericidial Effect | | | | | | Fungitoxicity, LD 95 | |
|---|---|---|---|---|---|---|---|---|---|---|---|---|---|
| | | Concentration | Broad bean | Bush bean | Ind. Cr. | Concentration | Salmonella typhimureum | Micrococcus aureus | Pseudomonas pyocyanea | Escherichia coli | Mycobacterium Phlei | Bacillus subtilis | |
| XV | $N_3.CO-\langle\rangle$ | 10<br>3 | 6<br>5 | 6<br>6 | 6<br>6 | $10^{-5}$<br>$10^{-5}$ | 5 | 5 | | | | | <4.1 | <4.1 |
| XVI | $N_3.CO-\langle\rangle-NH.CO.CH_3$ | 10<br>3 | 0<br>0 | 0<br>0 | 1<br>1 | $10^{-5}$<br>$10^{-5}$ | 6 | 6 | | 6 | | | 5.0 | 5.3 |
| XVII | $N_3.CO-\langle\rangle$ (NO$_2$) | 10<br>3 | 6<br>6 | 6<br>6 | 6<br>6 | $10^{-5}$<br>$10^{-5}$ | 6 | 6-7 | | 6 | | | 5.3 | 5.3 |
| XVIII | $N_3.CO-\langle\rangle-NH.CO.CH_3$ (NO$_2$) | 10<br>3 | 1<br>1 | 0<br>0 | 3<br>1 | $10^{-5}$<br>$10^{-5}$ | 6 | 6 | | 7 | | | 5.3 | 5.3 |
| XIX | $N_3.SO_2-\langle\rangle$ | 10<br>3 | 5<br>2 | 6<br>3 | 5<br>3 | | | | | | | | 4.1 | 4.4 |
| XX | $N_3.SO_2-\langle\rangle-NH.CO.CH_3$ | 10<br>3 | 1<br>0 | 0<br>0 | 0<br>0 | | | | | | | | 4.4 | 4.4 |

1.6 ml. (0.02 mol) of SOCl$_2$. This mixture was kept at room temperature for one hour while it was shaken occasionally: the initially formed viscous mass became partly crystalline. The ether was decanted and the last parts thereof were removed by evaporation. The residue was dissolved in 18 ml. of acetone and filtered to remove small fractions of undissolved substance. To the filtrate was added in drops, while cooled with ice (temperature lower than 5° C.), a solution of 1.5 g. of sodium azide in 5 ml. of water. This mixture was kept at 0° C. for half an hour. By adding ice water a microcrystalline substance was precipitated. This substance was filtered off and washed with water. Yield: 2.0 g. (50%) of substantially pure p-acetaminobenzazide. The substance decomposed under evolution of gas at about 124° C.

XVII. 3-Nitro-Benzazide

This compound was produced in accordance with a prescription of J. Pr. Chemie (2), 52, 228.

XVIII. 3-Nitro-4-Acetamino-Benzazide

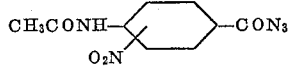

In accordance with the manner described in Example XXXV 7.3 g. (58%) of 3-nitro-4-acetamino-benzazide was obtained from 11.2 g. (0.05 mol.) of 3-nitro-4-acetamino-benzoic acid. The substance decomposed at 118° C.

(D) COMPOUNDS OF THE GENERAL FORMULA

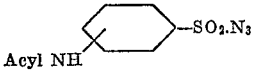

XIX. Benzene-Sulphonazide

This compound is described by Curtius and Lorenzen in J. Pr. Chemie, 58, page 174. The substance was produced in the manner there described from benzene-sulphochloride and sodium azide.

(E) COMPOUNDS OF THE GENERAL FORMULA

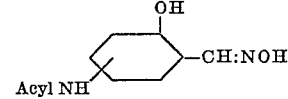

XXI. Salicylaldozime

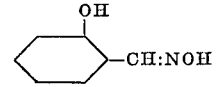

This substance was produced by a method as described in J.Am. Chem. Soc., 45, 1740 (1923).

XXII. 4-Acetamino-Salicylaldoxime

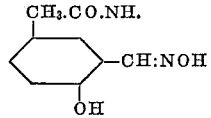

40.0 g. of 4-acetamino-salicylic acid and 57.2 g. of Na$_2$SO$_3$.10H$_2$O were dissolved, while stirring, at room temperature in a mixture of 1 litre of water and ½ l. of ethanol. To the clear solution obtained was added in succession 450 g. of sodium chloride, 40 g. of p-toluidine and 64 g. of boric acid and then in the course of one hour sodium amalgam (produced from 310 g. of mercury and 13 g. of sodium) and 320 g. of boric acid.

The reaction mixture was stirred at room temperature for further 4 hours: then the voluminous precipitation was filtered off and the liquid was decanted from the mercury. The precipitation obtained was washed with 1 l. of boiling water and recrystallized from 400 ml. of ethanol. Thus 12.5 g. of the Schiff's base was obtained in the crystalline state. The dry crystals had a melting point of 210 to 211° C.

To a suspension of 12 g. of the Schiff's base in 120 ml. of boiling ethanol was added a solution of 12 g. of hydroxylamine-HCl in 36 ml. of water, a clear solution being thus produced. The 4-acetaminosalicyl-aldoxim soon began to crystallize in the form of almost colorless needles. After one night at 0° C. the product was filtered off, washed and dried. The yield was 7.9 (91%) calculated on the Schiff's base: the melting point was 280° C. (while decomposing).

and

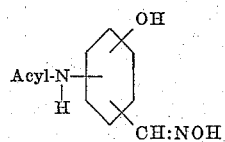

TABLE F

|  |  | Phytotoxicity |  |  |  | Fungitoxicity LD 95 |
| --- | --- | --- | --- | --- | --- | --- |
|  |  | Concentration | Broad bean | Bush bean | Ind. Cr. |  |
| XXI | 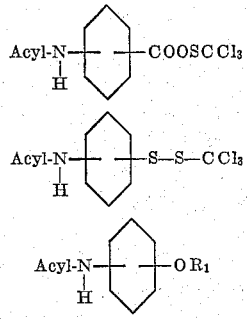 | 10<br>3 | 6<br>5 | 6<br>6 | 6<br>6 | 4.1   4.1 |
| XXII | 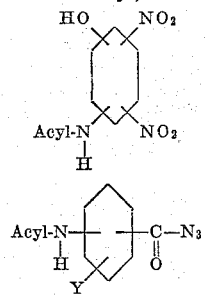 | 10<br>3 | 0<br>0 | 1<br>0 | 3<br>0 | ±2.9 |

Table D shows that the fungitoxicity has decreased, four times owing to the introduction of an acetyl-amino-group at the position 5 in 2-4 dinitro-phenol, while the decrease in phytotoxicity is a multiple of the decrease in fungitoxicity.

From Table C similar conclusions can be drawn.

While we have described our invention in connection with specific embodiments and applications, other modifications thereof will be readily apparent to those skilled in this art without departing from the spirit and scope of the invention as defined in the appended claims.

What we claim is:

1. A method of destroying bacteria and fungi harmful to plants comprising contacting the plants with a non-phytotoxic fungicidally and bactericidally active compound selected from the group consisting of compounds having the following structural formula:

Acyl-N(H)—⌬—COOSCCl₃

Acyl-N(H)—⌬—S—S—CCl₃

Acyl-N(H)—⌬—OR₁ wherein R₁ represents a substituent selected from the group consisting of H and acyl, Acyl-N(H)—⌬(HO)(NO₂)(NO₂)

Acyl-N(H)—⌬—C(Y)(=O)—N₃ wherein Y represents a member of the class consisting of H and the nitro radical, Acyl-N(H)—⌬—SO₂—N₃ and

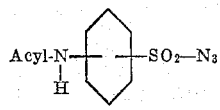

wherein acyl in all of said formula represents the acyl residue of a monocarboxylic acid selected from the group consisting of saturated aliphatic hydrocarbon, olefinically unsaturated hydrocarbon, phenylalkyl and naphthoic acids containing from 1 to 18 carbon atoms.

2. The method of claim 1 in which the active compound is employed in the form of an aerosol containing a solvent for the compound and a gaseous propellent therefor.

3. The method of claim 1 in which the active compound is employed in the form of a mixable oil containing an inert solvent for the compound and an emulsifier therefor.

4. The method of claim 1 in which the active compound is employed in the form of a sprayable powder containing an inert solid carrier therefor.

5. The method of claim 1 in which the active compound is employed in the form of a seed protecting powder containing an adhesive and a solid inert carrier therefor.

6. The method of claim 1 in which the active compound is employed in the form of a dusting composition containing an inert solid absorbent powder therefor.

7. A method of destroying bacteria and fungi harmful to plants comprising, contacting the plants with a non-phytotoxic pesticidal compound containing a compound corresponding to the formula:

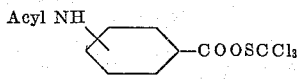

wherein acyl represents the acyl residue of a monocarboxylic acid selected from the group consisting of saturated aliphatic hydrocarbon, olefinically unsaturated hydrocarbon, phenylalkyl and naphthoic acids containing from 1 to 18 carbon atoms and an inert carrier therefor.

8. A method of destroying bacteria and fungi harmful to plants comprising, contacting the plants with a non-phytotoxic pesticidal compound containing a compound corresponding to the formula:

and an inert carrier therefor.

9. A method of destroying bacteria and fungi harmful to plants comprising, contacting the plants with a non-phytotoxic pesticidal compound containing a compound corresponding to the formula:

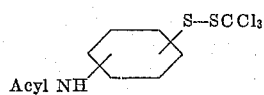

wherein acyl represents the acyl residue of a monocarboxylic acid selected from the group consisting of saturated aliphatic hydrocarbon, olefinically unsaturated hydrocarbon, phenylalkyl and naphthoic acids containing from 1 to 18 carbon atoms and an inert carrier therefor.

10. A method of destroying bacteria and fungi harmful to plants comprising, contacting the plants with a non-phytotoxic pesticidal compound containing a compound corresponding to the formula:

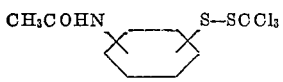

and an inert carrier therefor.

11. A method of destroying bacteria and fungi harmful to plants comprising, contacting the plants with a non-phytotoxic pesticidal compound containing a compound corresponding to the formula:

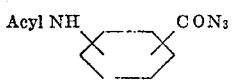

wherein acyl represents the acyl residue of a monocarboxylic acid selected from the group consisting of saturated aliphatic hydrocarbon, olefinically unsaturated hydrocarbon, phenylalkyl and naphthoic acids containing from 1 to 18 carbon atoms and an inert carrier therefor.

12. A method of destroying bacteria and fungi harmful to plants comprising, contacting the plants with a non-phytotoxic pesticidal compound containing a compound corresponding to the formula:

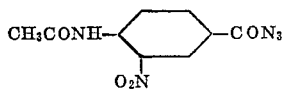

and an inert carrier therefor.

13. A method of destroying bacteria and fungi harmful to plants comprising, contacting the plants with a non-phytotoxic pesticidal compound containing a compound corresponding to the formula:

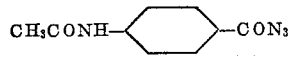

and an inert carrier therefor.

14. A method of destroying bacteria and fungi harmful to plants comprising, contacting the plants with a non-phytotoxic pesticidal compound containing a compound corresponding to the formula:

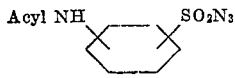

wherein acyl represents the acyl residue of a monocarboxylic acid selected from the group consisting of saturated aliphatic hydrocarbon, olefinically unsaturated hydrocarbon, phenylalkyl and naphthoic acids containing from 1 to 18 carbon atoms and an inert carrier therefor.

15. A method of destroying bacteria and fungi harmful to plants comprising, contacting the plants with a non-phytotoxic pesticidal compound containing a compound corresponding to the formula:

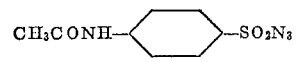

and an inert carrier therefor.

16. A method of destroying bacteria and fungi harmful to plants comprising, contacting the plants with a non-phytotoxic pesticidal compound containing a compound corresponding to the formula:

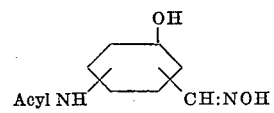

wherein acyl represents the acyl residue of a monocarboxylic acid selected from the group consisting of saturated aliphatic hydrocarbon, olefinically unsaturated hydrocarbon, phenylalkyl and naphthoic acids containing from 1 to 18 carbon atoms and an inert carrier therefor.

17. A method of destroying bacteria and fungi harmful to plants comprising, contacting the plants with a non-phytotoxic pesticidal compound containing a compound corresponding to the formula:

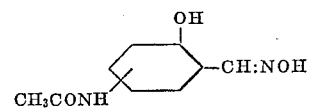

and an inert carrier therefor.

18. A method of destroying bacteria and fungi harmful to plants comprising, contacting the plants with a non-phytotoxic pesticidal compound containing a compound corresponding to the formula:

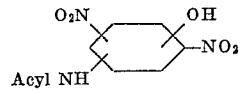

wherein acyl represents the acyl residue of a monocarboxylic acid selected from the group consisting of saturated aliphatic hydrocarbon, olefinically unsaturated hydrocarbon, phenylalkyl and naphthoic acids containing from 1 to 18 carbon atoms and an inert carrier therefor.

19. A method of destroying bacteria and fungi harmful to plants comprising, contacting the plants with a non-phytotoxic pesticidal compound containing a compound corresponding to the formula:

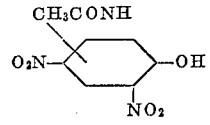

and an inert carrier therefor.

References Cited in the file of this patent
UNITED STATES PATENTS

| | | |
|---|---|---|
| 2,226,672 | Smith | Dec. 31, 1940 |
| 2,368,195 | Britton | Jan. 30, 1945 |
| 2,923,737 | Ruschig | Feb. 2, 1960 |
| 2,978,465 | Jerchel | Apr. 4, 1961 |